United States Patent [19]
Gilbert

[11] 3,787,170
[45] Jan. 22, 1974

[54] RAPID HEATING OF PARISON PREFORMS

[75] Inventor: Dixie E. Gilbert, Pomona, N.Y.

[73] Assignee: Phillips Petroleum Company, Bartlesville, Okla.

[22] Filed: Oct. 20, 1972

[21] Appl. No.: 299,388

Related U.S. Application Data

[62] Division of Ser. No. 143,006, May 13, 1971, Pat. No. 3,715,109.

[52] U.S. Cl. .................. 432/5, 432/122, 432/31, 264/94
[51] Int. Cl. ............................................. F27b 9/24
[58] Field of Search..... 432/122, 4, 152, 5, 8, 9, 27, 432/31, 52, 56, 57, 230, 51, 137, 67, 133, 134; 219/388; 264/94, 97, 98

[56] References Cited
UNITED STATES PATENTS

| 3,627,282 | 12/1971 | Kinslow, Jr. | 432/122 |
| 3,283,047 | 11/1966 | Savary | 264/94 |
| 3,278,665 | 10/1966 | Harrison | 264/98 |
| 3,586,748 | 6/1971 | Ayres | 264/98 |
| 2,100,222 | 11/1937 | McFarland | 432/133 |
| 3,477,700 | 11/1969 | Kinslow, Jr. | 432/124 |
| 3,554,506 | 1/1971 | Seefluth | 432/5 |
| 3,662,049 | 5/1972 | Gilbert | 264/98 |

Primary Examiner—John J. Camby
Assistant Examiner—Henry C. Yuen
Attorney, Agent, or Firm—Quigg & Oberlin

[57] ABSTRACT

Tubular parison preforms are heated to orientation temperature by means of external radiant heat combined with affirmative heating of the parison on the inside.

6 Claims, 7 Drawing Figures

PATENTED JAN 22 1974 3,787,170
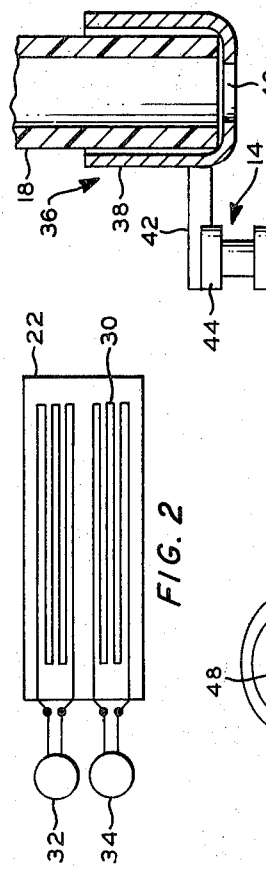
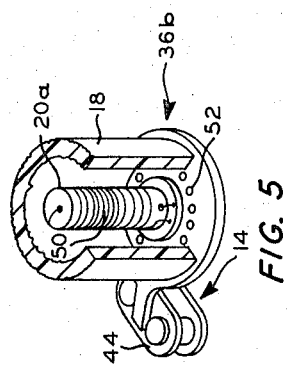
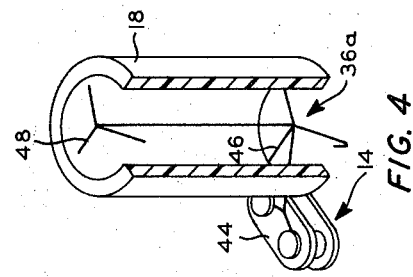
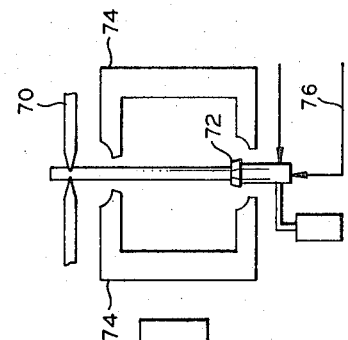
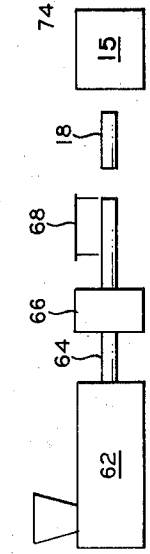
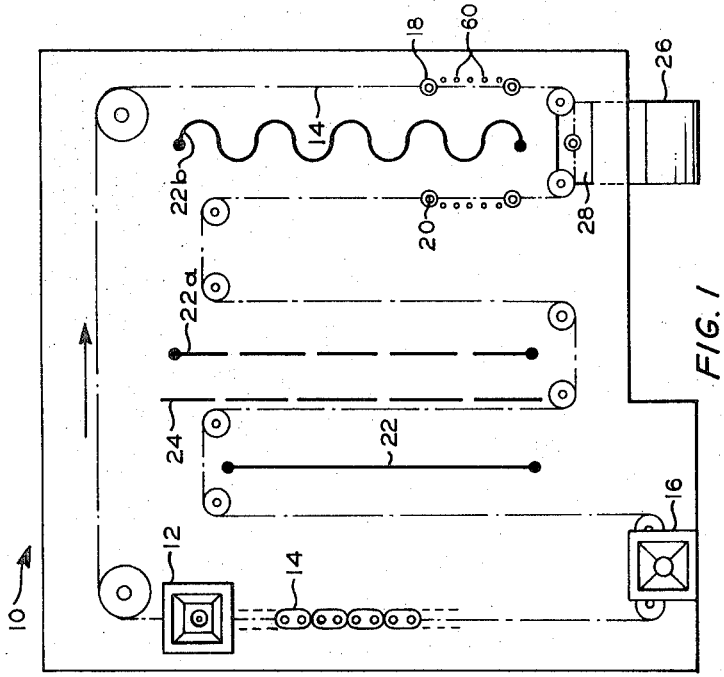
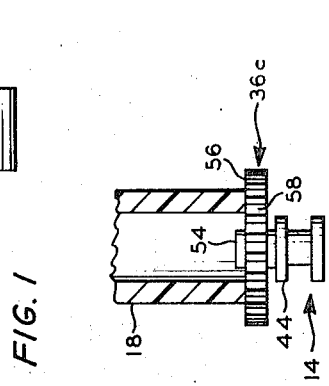

3,787,170

RAPID HEATING OF PARISON PREFORMS

CROSS REFERENCE TO RELATED APPLICATION

This is a divisional of application Ser. No. 143,006, filed May 13, 1971, now Pat. No. 3,715,109.

BACKGROUND OF THE INVENTION

This invention relates to heating hollow parison preforms.

Recently there has been developed a process whereby hollow articles such as bottles can be produced at orientation temperature so as to have remarkable resistance to impact. This process is described in Wiley, U.S. Pat. No. 3,288,317, and Turner et al., U.S. Pat. No. 3,390,426, for instance. It is much less difficult to achieve orientation on a heating cycle than on a cooling cycle and thus it is preferred to provide tubular parisons at ambient temperature which are subsequently heated to orientation temperature.

In addition to producing a highly impact resistant product, the process as exemplified by said Turner et al and Wiley patents allows a rapid cycle time for the molding operation. Thus it turns out that the limiting factor in this process can very easily become the time required to heat the parisons. Furthermore, the ideal temperature range for achieving orientation temperature is relatively narrow and a difference of only a degree or two can greatly affect the subsequent fabrication. For instance, if some portions of the parison are too hot or too cold, the parison cannot expand evenly. Thus, the heating must be both rapid and at the same time of controlled uniformity.

SUMMARY OF THE INVENTION

It is an object of this invention to heat thermoplastic preforms rapidly; and it is yet a further object of this invention to heat thermoplastic parison preforms uniformly.

In accordance with this invention, thermoplastic parison preforms are heated to orientation temperature by applying radiant heat from the outside while simultaneously heat is affirmatively applied to the interior of said parison.

BRIEF DESCRIPTION OF THE DRAWINGS

In the drawings, forming a part hereof, wherein like reference characters denote like parts in the various views, FIG. 1 is a plan view with portions broken away showing the heating oven of the invention;

FIG. 2 is a side view of one heating panel;

FIG. 3 is a sectional view of one embodiment of a parison holding means;

FIG. 4 is a sectional view of another embodiment of the parison holding means;

FIG. 5 is a sectional view of yet another embodiment of the parison holding means showing an internal heating element;

FIG. 6 is still yet another embodiment of the parison holding means, which in this embodiment is adapted to rotate; and FIG. 7 is a schematic representation of an entire blow molding operation employing the rapid heating of the invention.

DESCRIPTION OF THE PREFERRED EMBODIMENTS

The heating apparatus of the instant invention can be used in the heating of any thermoplastic parison preform. Exemplary polymers from which these parisons can be made are orientable crystalline materials such as polymers of at least one mono-1-olefin having two to eight carbon atoms per molecule and orientable amorphous materials such as poly(vinyl chloride), polystyrene, butadiene containing polymers and styrene-acrylonitrile containing polymers. Preferred polymers are polymers and copolymers of ethylene, propylene, and 1-butene, particularly polypropylene. These polymers can be formed into hollow parison preforms by simple extrusion or injection molding or other conventional technique and thereafter cooled to ambient temperature.

In the case of crystalline polymers, they are generally reheated to a temperature of 1°–50°, preferably 10°–30°F. below the crystalline melting point. For amorphous polymers, this temperature is generally 40°–225°, preferably 100°–175°F. below the homogeneous melt point. Thus polypropylene, for instance would preferably be heated to a temperature within the range of 310°–330°F.

The radiant panel heaters can be any conventional heating means which can be utilized to produce radiant heat. For example, a heater comprising nichrome wire within quartz tubes is satisfactory. The heaters may be designed to allow the input of greater amount of heat at selected areas along the longitudinal direction. The heaters may be controlled by adjusting the voltage by means of a variable autotransformer such as a variac, a device sold by the General Radio Company for this purpose, or by means of a temperature controller having a sensing element for either determining the temperature within the heating chamber or determining the surface temperature of the radiant heater. Since the radiant heat travels in straight lines from any given point, the parisons are not heated uniformly in circumferential direction unless some means is utilized to compensate for this. One such means is to rotate the parison holding device. This can be accomplished either by having the parison holding device an integral part of a gear having teeth which cause the gear to be turned as it contacts pins as it moves through the heating chamber on a continuous chain, or else simply by making the parison holding device freely rotatable and providing for friction contact with a stationary member as the holding device is moved through the heating chamber on an endless chain. Alternatively, the heating panel can be corrugated so as to uniformly distribute the radiant heat on the parisons.

It is essential to the invention that the parisons be heated from the outside by means of radiant heat and at the same time have an affirmative input of heat to the interior thereof. In the case of open end parisons, the affirmative input of heat to the interior can be accomplished in a number of ways. For instance, a mandrel can extend into the interior of the parison, which mandrel has provisions for being heated. As with the heating panels, this heated mandrel may either be uniformly heated or have a provision for programming the heat axially along the mandrel so as to impart greater heat to some portions of the parison than to others. Or means can be provided to force a current of hot air through the open parison. In this regard it is noted that the parisons will generally be in a circulating air oven although this is not essential as it is possible to obtain rapid heating of the parison solely by means of radiant heat imparted from the outside and the affirmative input of heat to the interior of the parison.

In many instances, it will be desirable to utilize baffles to insure even heating of the parisons or to effect the establishment of a temperature gradient along the length of the parison when it is desired to do so.

Operation in accordance with this invention allows exceptional flexibility in the heating of the parisons. For instance, it is possible to utilize radiant heaters in air ovens to quickly heat the parison to the orientation temperature which may be affected in as little as 5 minutes and thereafter to allow the parison to remain in the air oven for about an equal period of time so as to allow any temperature variations to even out. Or the parison may be heated in an air oven to a temperature of within 10°–30° of the final temperature desired and at that point utilize radiant heat for the first time.

Referring now to the drawings, particularly FIG. 1 there is shown an oven or heating chamber 10 having a parison loading station 12 and a continuous chain 14 for carrying parisons on a back-and-forth path through said oven. The thus heated parisons are removed at picker station 16. The cutaway portion of the FIGURE shows open end tubular parisons 18 carried by chain 14. Mandrel 20 of said carrying means holds the parison upright. The outside of the parisons are subjected to radiant heat from panels 22, 22a, and corrugated panel 22b. Baffle shield 24 is positioned so as to equalize the heat input along the path of the chain. Blower 26 has an outlet 28 directly under the parison so as to circulate hot air to the interior thereof to affirmatively heat same. Similar blowers may be utilized throughout the oven to provide a circulating hot air oven in the conventional sense with the radiant heaters merely supplementing the heated air or the blower can be utilized solely for circulating air through the interior of the parison. As noted hereinbefore the blower 26 can be eliminated if mandrel 20 is heated.

Referring now to FIG. 2 there is shown in greater detail the heating panels 22 having embedded therein quartz-covered nichrome wires 30. Individual sections of this panel are controlled by individual temperature controllers 32 and 34.

FIG. 3 shows an alternative embodiment of a parison holding means 36 comprising a cup-shaped member 38 having an opening 40 in the center thereof. Member 38 is attached to endless chain 14 by means of flange 42 which is connected to upper link plate 44. This conveying means allows hot air to be circulated up through parison 18 so as to affirmatively impart heat to the interior thereof.

Referring now to FIG. 4 there is shown an alternative embodiment wherein parison holding means 36a comprises a first spider means 46 on which parison 18 rests and a second spider means 48 having members which contact the interior of the parison over a restricted area to hold same in an upright position. In this way the entire parison can be heated. It is noted that in the embodiment shown in FIG. 3 wherein member 38 tends to shield a portion of the parison from the heat, the subsequent blowing operations can be effected in such a way that this end is utilized to form the threads with the other end which is not shielded being the end which is closed off so as to facilitate sealing.

FIG. 5 shows another alternative embodiment wherein parison holding means 36b is connected to link plate 44 and has a mandrel 20a containing resistance wire 50 which serves to furnish heat to affirmatively heat the inside of the parison. Resistance wires 50 are shown in this embodiment wound closer together in certain areas so as to provide greater heat. In this regard it is noted that it is generally desired to have the temperature uniform in a circumferential direction. As to the longitudinal direction, the temperature should either be uniform or else there should be one and only one place where the temperature is very slightly higher, for instance, 0.5° to 5°, preferably 0.75° to 2° higher so that the parison on subsequent fabrication will form an initial bubble at this point on the introduction of internal fluid pressure and this single bubble will propogate out to fill the entire mold. In this embodiment, apertures 52 are provided so that combination of circulating hot air and a heated mandrel can be utilized to heat the interior of the parison.

FIG. 6 shows yet another alternative embodiment of the parison holding means wherein member 36c is attached to bearing 54 on chain 14 so as to be freely rotatable thereon. Base portion 56 of said holding means 36c has teeth 58 which engage pins 60 (see FIG. 1) so as to cause said holding means to rotate as chain 14 is advanced through the oven. This advance of chain 14 can either be intermittent or continuous depending on the type of loading mechanism and picking mechanism utilized. Generally it will be intermittent.

In operation, parison 18 is first introduced onto a holding means 36 at loading station 12. The parison is carried by chain 14 through the radiant heating zone where it is heated from the outside by means of radiant heaters 22 and heated from the inside by means of the circulation of hot air by blower 26 and/or heat from a heated mandrel 20. On reaching station 16 a picker mechanism reaches into the oven and moves the thus-heated parison axially straight up out of the oven and immediately transfers same to the a molding station.

FIG. 7 shows an entire parison forming, reheating, and molding operation wherein an extrusion means 62 forms a tubular extrudate 64 which is sized and cooled in chamber 66 and cut into individual parison and preforms 18 by cutting mechanism 68. The parisons, open at each end, are then reheated in oven 15 as described hereinabove and transferred by picker mechanism 70 to thread-forming jaw means 72, mechanism 70 serving as means to remove said thus heated parison from said heating means. Thereupon the parison is stretched axially while still at orientation temperature by means of relative axial movement between members 72 and member 70. Mold halves 74 then close on the said parison pinching said parison shut and severing same at the upper end thereof. Blow fluid is then introduced through line 76 to expand said parison out into conformity with the walls of mold 74.

Many conventional parts such as temperature controllers, thermostats, frame members and the like have been omitted from the drawings for the sake of simplicity but their inclusion is understood by those skilled in the art and is within the scope of the invention.

EXAMPLE I

Propylene homopolymer having a density of 0.905

(ASTM D 1505-63T), and a melt flow of 2 (ASTM D 1238-62T, Condition L), and a crystalline melting point of about 340°F was extruded into tubing having an outside diameter of 24 millimeters and a wall thickness of 0.150 inch. The tubing was cooled to room temperature in a vacuum sizing and quenching chamber and cut into 7 inch lengths. These 7 inch lengths were placed in a heating chamber such that shown in the FIGURES, said chamber being a circulating air oven with 600 watt radiant heaters disposed as is shown in FIG. 1. The parisons were carried through said oven on hollow parison support means so as to allow circulation of hot air through the interior thereof. The parisons were rotated about the longitudinal axis about one revolution for each six inches of travel of the parison through the oven. The parisons were uniformly heated to orientation temperature of 320°F. in 7½ minutes.

Identical parisons were heated in identical ovens except without the panel heaters and with unheated parison support means which closed off the bottom of the parison so as to preclude free circulation of hot air therethrough. The time for heating to the same orientation temperature utilizing optimum conditions was 30 minutes.

EXAMPLE II

Identical parisons to those of Example I were heated in an identical oven except the parison support members had an internal mandrel which was heated. The mandrel comprises a central core having resistance wire therearound, which wire was heated by means of a 28 volt DC current. The chain was the ground side and a bus bar was provided to complete the circuit. The time for heating the parison to a temperature of 320°F. was 7½ minutes.

While this invention has been described in detail for the purpose of illustration, it is not to be construed as limited thereby, but is intended to cover all changes and modifications within the spirit and scope thereof.

I claim:

1. A method of heating a hollow open end tubular thermoplastic parison to orientation temperature comprising:

introducing said parison into a radiant heating zone to apply radiant heat to the outside thereof;

affirmatively applying heat to the interior of said parison;

and removing said thus-heated parison from said heating zone while at orientation temperature.

2. A method according to claim 1 wherein said heat is applied to said interior by circulating hot air axially through said interior of said parison.

3. A method according to claim 1 wherein said heat is applied to said interior of said parison from an internally disposed heat source.

4. A method according to claim 1 wherein said radiant heating zone is in a circulating air oven having radiant heating panels.

5. A method according to claim 1 wherein said parison is made of polypropylene and is heated to a temperature within the range of 310°-330°F.

6. A method according to claim 1 wherein said parisons are rotated about their longitudinal axis during said heating.

* * * * *